(12) United States Patent  
Lin

(10) Patent No.: US 8,647,519 B1  
(45) Date of Patent: Feb. 11, 2014

(54) MANUFACTURING METHOD OF TOUCHPAD

(71) Applicant: Chih-Chung Lin, Taipei (TW)

(72) Inventor: Chih-Chung Lin, Taipei (TW)

(*) Notice: Subject to any disclaimer, the term of this patent is extended or adjusted under 35 U.S.C. 154(b) by 0 days.

(21) Appl. No.: 13/760,054

(22) Filed: Feb. 6, 2013

(30) Foreign Application Priority Data

Dec. 19, 2012 (TW) .............................. 101148209 A

(51) Int. Cl.  
*H01B 13/00* (2006.01)

(52) U.S. Cl.  
USPC .............................. 216/13; 345/173; 345/174

(58) Field of Classification Search  
USPC .................. 216/13; 438/689; 345/173, 174  
See application file for complete search history.

(56) References Cited

U.S. PATENT DOCUMENTS

2010/0026661 A1* 2/2010 Teramoto ...................... 345/174

* cited by examiner

*Primary Examiner* — Roberts Culbert

(57) ABSTRACT

A manufacturing method of touchpad includes steps of: providing a substrate and disposing a shield layer on the substrate, a section of the substrate, where the shield layer is positioned being defined as a non-touch section, a section of the substrate, which is free from the shield layer being defined as a touch section; disposing a touch electrode layer with multiple touch electrodes on the substrate; disposing a metal wiring layer with multiple metal wires on the touch electrode layer; performing a first time of lithography and etching processes to the metal wiring layer so as to form multiple metal wires on the non-touch section; and performing a second time of lithography and etching processes to the touch electrode layer so as to form multiple touch electrodes on the non-touch section and the touch section. The manufacturing method saves the cost for masks and shortens the manufacturing time.

10 Claims, 5 Drawing Sheets

MANUFACTURING METHOD OF TOUCHPAD

This application claims the priority benefit of Taiwan patent application number 101148209 filed on Dec. 19, 2012.

BACKGROUND OF THE INVENTION

1. Field of the Invention

The present invention relates generally to a manufacturing method of touchpad, and more particularly to a manufacturing method of touchpad, which can save the cost for the masks to lower the manufacturing cost.

2. Description of the Related Art

Along with the rapid advance of information techniques, various digital products such as mobile phones, personal digital assistants (PDA), notebooks and tablets have been more and more popularized. These digital products have more functions and more beautiful appearances and can be more conveniently used.

It is known that the display screen of a digital product such as mobile phone, PDA, notebook and tablet is an inevitable human/device communication interface. The display screen facilitates operation of the digital product. Generally, the display screen is a liquid crystal display as a mainstream.

In recent years, along with the rapid development of information techniques, wireless mobile communication industries and domestic electrical information appliances, various information products have employed touch panels instead of the conventional input devices such as keyboards and mice. In the touch panels, capacitive touch liquid crystal display devices have become the most popular products at the present time.

The touch liquid crystal display device is shortened to touch panel hereinafter. The touch panel is laminated structure including glass substrate, touch electrode layer, shield layer, electrode wiring layer, insulation layer and protection layer. These layers are stacked to form the laminated structure. The glass substrate has a touch section and a non-touch section. The touch electrode layer is coated on rear side of the touch section of the glass substrate by means of sputtering. Then the touch electrodes are formed by means of lithography and etching processes. Then an ink layer is printed on the non-touch section of the substrate as the shield layer. Then the electrode wiring layer is coated on the shield layer by means of sputtering. Then the electrode wires are formed by means of lithography and etching processes. Then insulation ink is printed on the touch electrode extension ends and the non-corresponding electrode wires in the shield section so as to avoid short-circuit between the touch electrode extension ends and the non-corresponding electrode wires. Then, the protection layer is coated on the glass substrate, the touch electrode layer, the shield layer, the electrode wiring layer and the insulation layer by means of coating. In the conventional manufacturing method of touch panel, the touch electrodes and the electrode wires are formed by means of sputtering, lithography and etching processes. The cost for the mask is quite high and the sputtering process is quite time-consuming. As a result, the manufacturing cost of the conventional touch panel is very high and the manufacturing time of the conventional touch panel is relatively long.

SUMMARY OF THE INVENTION

It is therefore a primary object of the present invention to provide a manufacturing method of touchpad, which can shorten the manufacturing time of the touchpad.

It is a further object of the present invention to provide the above manufacturing method of touchpad, which can lower the manufacturing cost of the touchpad.

To achieve the above and other objects, the manufacturing method of touchpad of the present invention includes steps of:

providing a substrate and disposing a shield layer on the substrate, a section of the substrate, where the shield layer is positioned being defined as a non-touch section, a section of the substrate, which is free from the shield layer being defined as a touch section;

disposing a touch electrode layer with multiple touch electrodes on the substrate;

disposing a metal wiring layer with multiple metal wires on the touch electrode layer;

performing a first time of lithography and etching processes to the metal wiring layer so as to form multiple metal wires on the non-touch section;

performing a second time of lithography and etching processes to the touch electrode layer so as to form multiple touch electrodes on the non-touch section and the touch section;

disposing an insulation layer on the touch electrodes, the insulation layer being formed with multiple electrical connection holes corresponding to the touch electrodes;

disposing a lead layer with multiple metal leads on the insulation layer, the metal leads passing through the electrical connection holes to electrically connect with the touch electrodes; and disposing a protection layer on the touch electrode layer and the lead layer and the insulation layer.

According to the manufacturing method of touchpad of the present invention, the manufacturing time is greatly shortened and the use of the mask is reduced so that the manufacturing cost is lowered.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
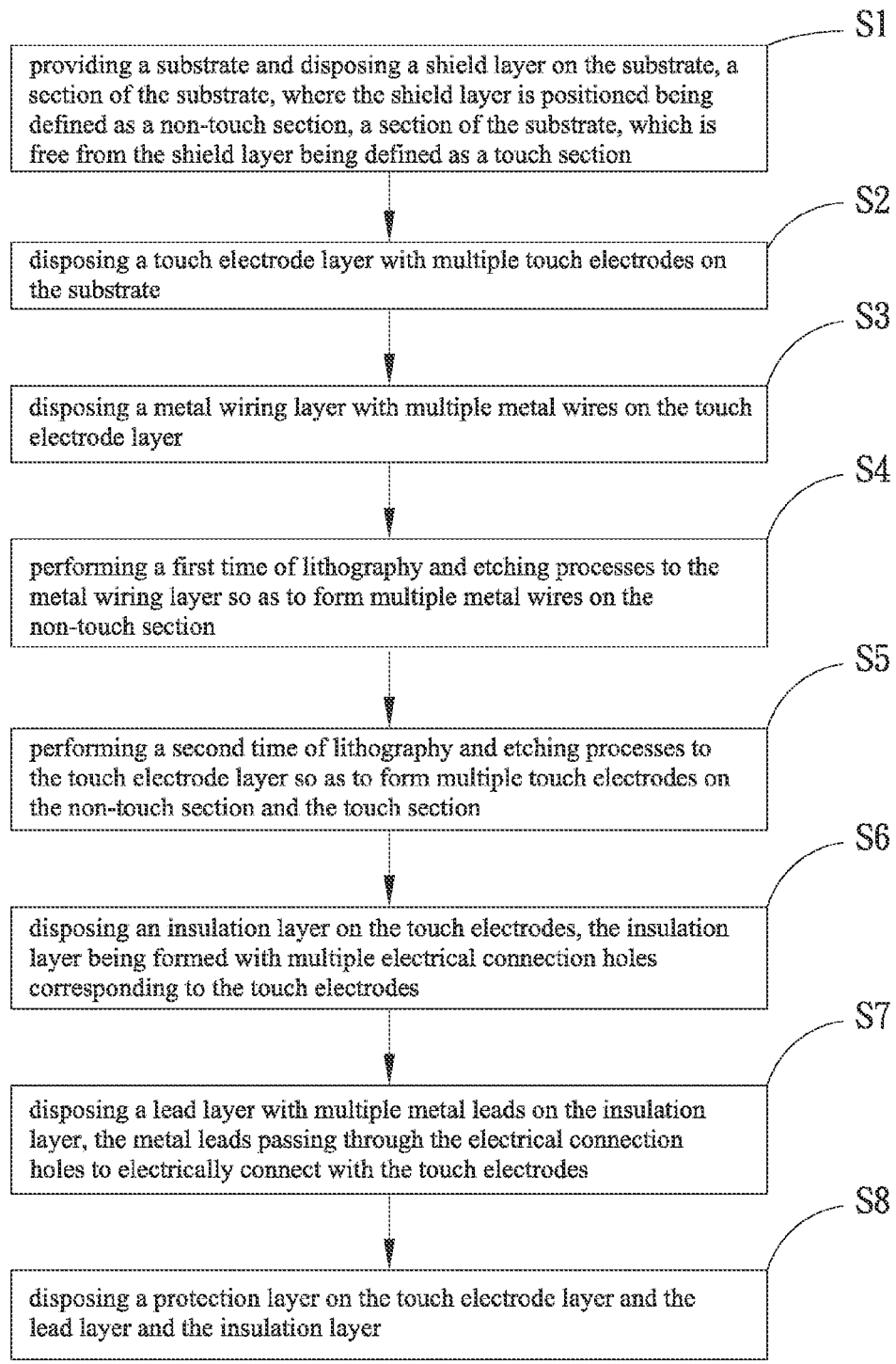
FIG. 1 is a flow chart of a first embodiment of the manufacturing method of touchpad of the present invention.
Figure 2:
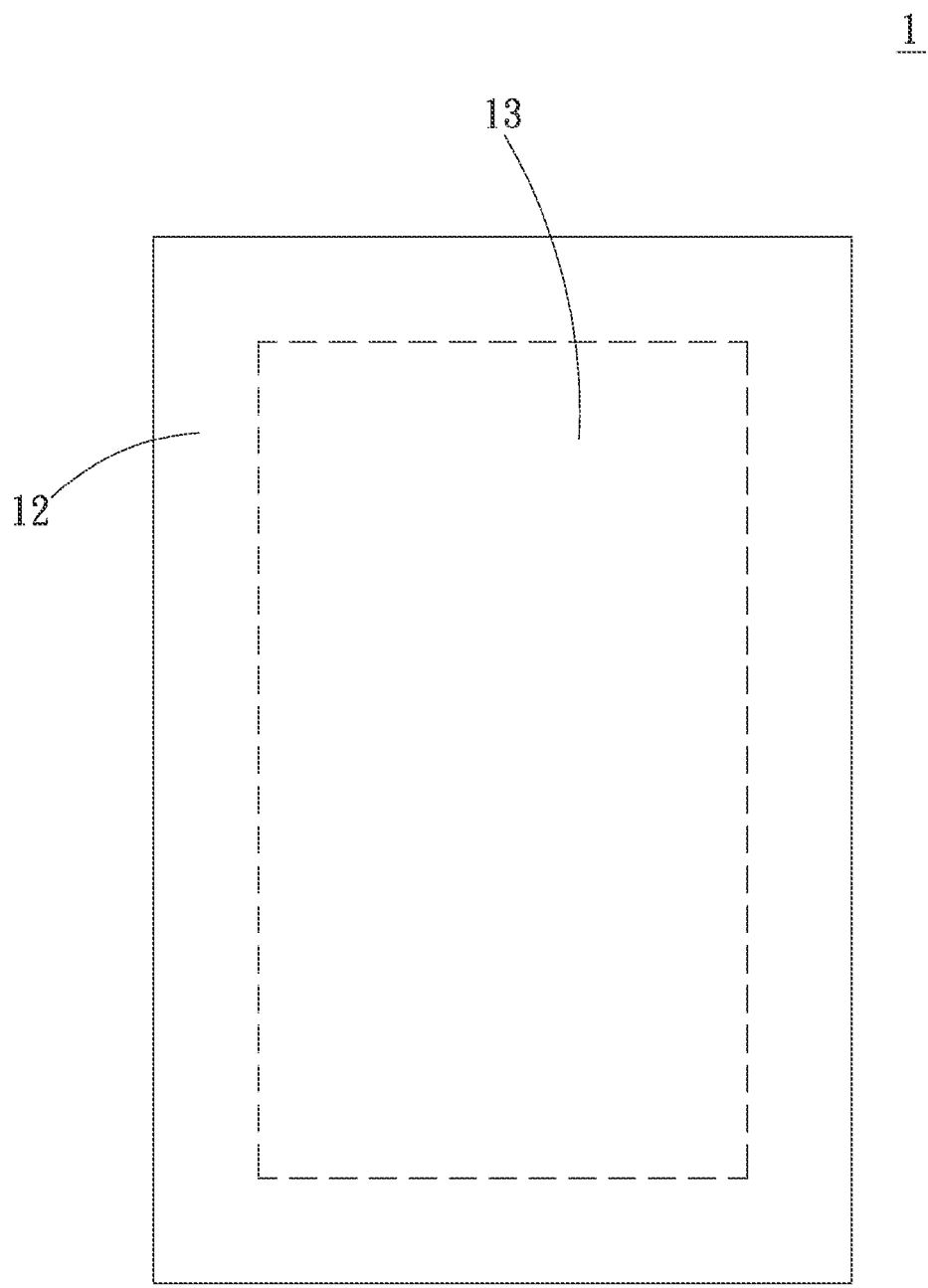
FIG. 2 is a schematic diagram showing the structure of the touchpad of the first embodiment of the manufacturing method of touchpad of the present invention.
Figure 3:
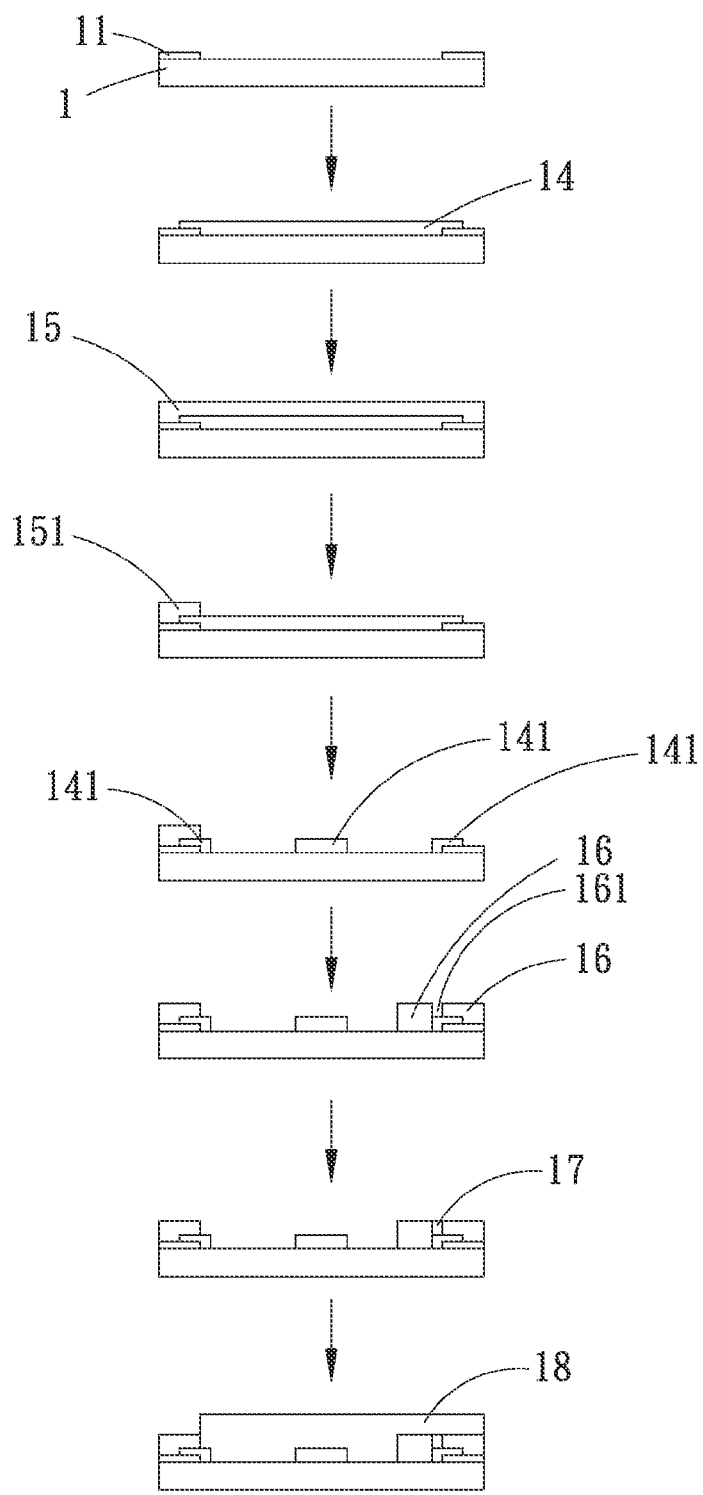
FIG. 3 is a schematic diagram showing the first embodiment of the manufacturing method of touchpad of the present invention.

Please refer to FIGS. 1, 2 and 3. FIG. 1 is a flow chart of a first embodiment of the manufacturing method of touchpad of the present invention. FIG. 2 is a schematic diagram showing the structure of the touchpad of the first embodiment of the manufacturing method of touchpad of the present invention. FIG. 3 is a schematic diagram showing the first embodiment of the manufacturing method of touchpad of the present invention. According to the first embodiment, the manufacturing method of touchpad of the present invention includes steps of:

S1. providing a substrate and disposing a shield layer on the substrate, a section of the substrate, where the shield layer is positioned being defined as a non-touch section, a section of the substrate, which is free from the shield layer being defined as a touch section, a substrate 1 being provided, the substrate 1 being a transparent board material made of glass or polymer material, an ink being sprayed onto the substrate 1 to form a shield layer 11 thereon, a section of the substrate 1, where the shield layer 11 is positioned being defined as a non-touch section 12, while a section of the substrate 1, which is free from the shield layer 11 being defined as a touch section 13, in this embodiment, the substrate 1 being made of transparent glass material by means of a process, which is identical to that of the conventional manufacturing method and thus will not be further described hereinafter;

S2. disposing a touch electrode layer with multiple touch electrodes on the substrate, a touch electrode layer 14 being formed on the substrate 1 by means of sputtering, the touch electrode layer 14 being selected from a group consisting of indium tin oxide (ITO), indium zinc oxide, indium tin zinc oxide, hafnium oxide, zinc oxide, aluminum oxide, aluminum tin oxide, aluminum zinc oxide, cadmium tin oxide and cadmium zinc oxide;

S3. disposing a metal wiring layer with multiple metal wires on the touch electrode layer, a metal wiring layer 15 being disposed on the touch electrode layer 14 by means of sputtering;

S4. performing a first time of lithography and etching processes to the metal wiring layer so as to form multiple metal wires on the non-touch section, a first time of lithography and etching processes being performed to the metal wiring layer 15 to form multiple metal wires 151 on the non-touch section 12, the etching liquid used in the first time of lithography and etching processes being selected from a group consisting of phosphate, nitric acid, acetic acid and water;

S5. performing a second time of lithography and etching processes to the touch electrode layer so as to form multiple touch electrodes on the non-touch section and the touch section, a second time of lithography and etching processes being performed to the touch electrode layer 14 to form multiple touch electrodes 141 on the non-touch section 12 and the touch section 13, the etching liquid used in the second time of lithography and etching processes being selected from a group consisting of nitric acid, hydrochloric acid and water;

S6. disposing an insulation layer on the touch electrodes, the insulation layer being formed with multiple electrical connection holes corresponding to the touch electrodes, an insulation layer 16 being coated on the junctions between the touch electrodes and the metal wires in the non-touch section 12, a wet etching process being performed to the insulation layer 16 to form multiple electrical connection holes 161 corresponding to the touch electrodes 141, the insulation layer 16 being formed by means of halftone print process or plate print process, the insulation layer 16 being made of a material with a dielectric coefficient of 2-4, which can be a transparent insulation material such as ink or a nontransparent insulation material or an inorganic material or an organic material, the inorganic material being selected from a group consisting of silicon oxide, silicon nitride, silicon oxynitride, silicon carbide, hafnium oxide and aluminum oxide, the organic material being selected from a group consisting of photoresistor, enzocyclobutane (BCB), cycloolefins, polyesters, polyalcohols, polyethylene oxides, polyphenylenes, resins, polyethers and polyketones;

S7. disposing a lead layer with multiple metal leads on the insulation layer, the metal leads passing through the electrical connection holes to electrically connect with the touch electrodes, metal leads 17 being disposed on the insulation layer 16 and in the preformed electrical connection holes 161 by means of silver paste printing or sputtering so as to electrically connect the touch electrodes 141 to the metal wires 151; and S8. disposing a protection layer on the touch electrode layer and the lead layer and the insulation layer, a protection layer 18 being formed on the touch electrode layer 141, the metal wiring layer 151 and the insulation layer 16 by means of deposition so as to protect the touch electrode layer 141, the insulation layer 16 and the metal leads 17.

Figure 4:
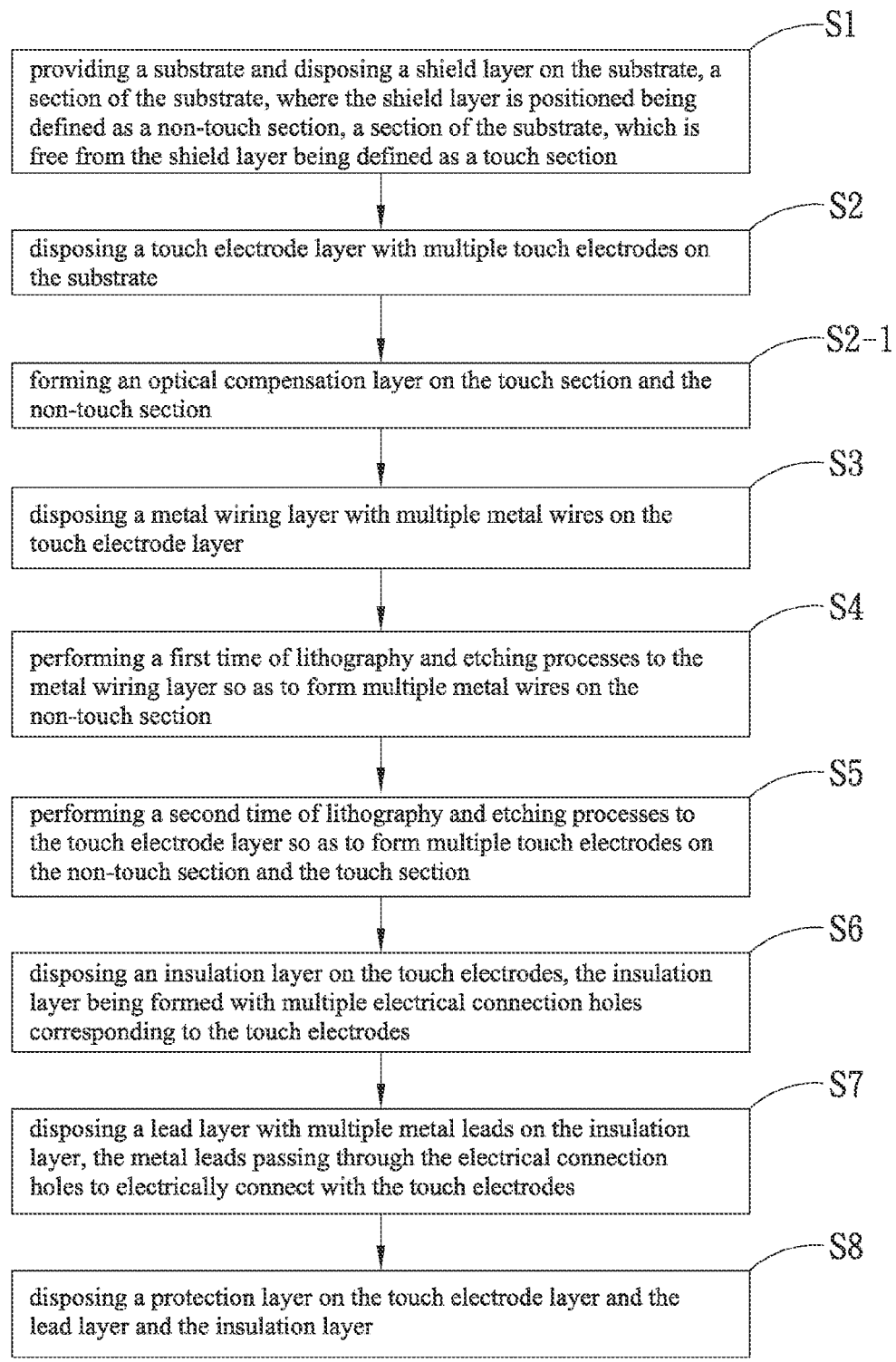
FIG. 4 is a flow chart of a second embodiment of the manufacturing method of touchpad of the present invention.
Figure 5:
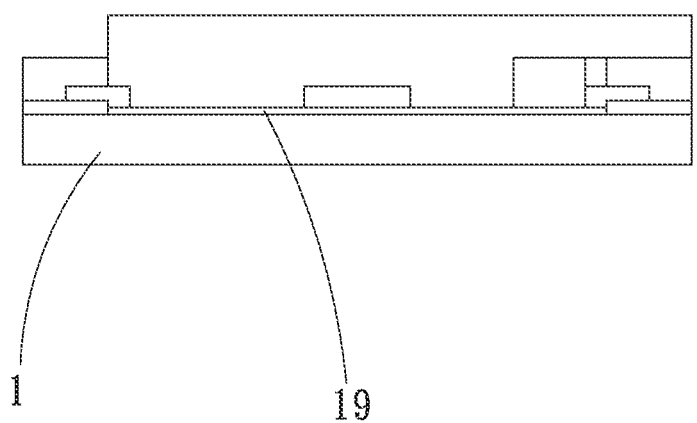
FIG. 5 is a schematic diagram showing the structure of the touchpad of the second embodiment of the manufacturing method of touchpad of the present invention.

Please refer to FIGS. 4 and 5. FIG. 4 is a flow chart of a second embodiment of the manufacturing method of touchpad of the present invention. FIG. 5 is a schematic diagram showing the structure of the touchpad of the second embodiment of the manufacturing method of touchpad of the present invention. According to the second embodiment, the manufacturing method of touchpad of the present invention includes steps of:

S1. providing a substrate and disposing a shield layer on the substrate, a section of the substrate, where the shield layer is positioned being defined as a non-touch section, a section of the substrate, which is free from the shield layer being defined as a touch section;

S2. disposing a touch electrode layer with multiple touch electrodes on the substrate;

S3. disposing a metal wiring layer with multiple metal wires on the touch electrode layer;

S4. performing a first time of lithography and etching processes to the metal wiring layer so as to form multiple metal wires on the non-touch section;

S5. performing a second time of lithography and etching processes to the touch electrode layer so as to form multiple touch electrodes on the non-touch section and the touch section;

S6. disposing an insulation layer on the touch electrodes, the insulation layer being formed with multiple electrical connection holes corresponding to the touch electrodes;

S7. disposing a lead layer with multiple metal leads on the insulation layer, the metal leads passing through the electrical connection holes to electrically connect with the touch electrodes; and S8. disposing a protection layer on the touch electrode layer and the lead layer and the insulation layer.

The second embodiment is partially identical to the first embodiment and thus will not be further described hereinafter. The second embodiment is different from the first embodiment in that between step S2 of disposing a touch electrode layer with multiple touch electrodes on the substrate and step S3 of disposing a metal wiring layer with multiple metal wires on the touch electrode layer, the second embodiment further includes a step S2-1 of forming an optical compensation layer on the touch section and the non-touch section. The optical compensation layer 19 is disposed on the substrate by means of sputtering.

According to the manufacturing method of touchpad of the present invention, the manufacturing time is greatly shortened and the use of the mask is reduced so that the manufacturing cost is lowered.

In conclusion, in comparison with the conventional manufacturing method, the present invention has the following advantages:

1. The manufacturing cost is lowered.
2. The use of the mask is reduced.

The present invention has been described with the above embodiments thereof and it is understood that many changes and modifications in the above embodiments can be carried out without departing from the scope and the spirit of the invention that is intended to be limited only by the appended claims.

What is claimed is:

1. A manufacturing method of touchpad, comprising steps of:
   providing a substrate and disposing a shield layer on the substrate, a section of the substrate, where the shield layer is positioned being defined as a non-touch section, a section of the substrate, which is free from the shield layer being defined as a touch section;
   disposing a touch electrode layer with multiple touch electrodes on the substrate;
   disposing a metal wiring layer with multiple metal wires on the touch electrode layer;
   performing a first time of lithography and etching processes to the metal wiring layer so as to form multiple metal wires on the non-touch section;
   performing a second time of lithography and etching processes to the touch electrode layer so as to form multiple touch electrodes on the non-touch section and the touch section;
   disposing an insulation layer on the touch electrodes, the insulation layer being formed with multiple electrical connection holes corresponding to the touch electrodes;
   disposing a lead layer with multiple metal leads on the insulation layer, the metal leads passing through the electrical connection holes to electrically connect with the touch electrodes; and
   disposing a protection layer on the touch electrode layer and the lead layer and the insulation layer.

2. The manufacturing method of touchpad as claimed in claim 1, wherein the touch electrode layer is formed on the substrate by means of sputtering, the touch electrode layer being selected from a group consisting of indium tin oxide (ITO), indium zinc oxide, indium tin zinc oxide, hafnium oxide, zinc oxide, aluminum oxide, aluminum tin oxide, aluminum zinc oxide, cadmium tin oxide and cadmium zinc oxide.

3. The manufacturing method of touchpad as claimed in claim 1, wherein an ink is sprayed onto the substrate to form the shield layer thereon.

4. The manufacturing method of touchpad as claimed in claim 1, wherein the metal wiring layer is disposed on the touch electrode layer by means of sputtering.

5. The manufacturing method of touchpad as claimed in claim 1, wherein the insulation layer is formed by means of halftone print or plate print.

6. The manufacturing method of touchpad as claimed in claim 1, wherein the protection layer is made of an inorganic material or an organic material, the inorganic material being selected from a group consisting of silicon oxide, silicon nitride, silicon oxynitride, silicon carbide, hafnium oxide and aluminum oxide, the organic material being selected from a group consisting of photoresistor, enzocyclobutane (BCB), cycloolefins, polyesters, polyalcohols, polyethylene oxides, polyphenylenes, resins, polyethers and polyketones.

7. The manufacturing method of touchpad as claimed in claim 1, further comprising a step of forming an optical compensation layer on the touch section and the non-touch section after the step of disposing a touch electrode layer with multiple touch electrodes on the substrate.

8. The manufacturing method of touchpad as claimed in claim 1, wherein the insulation layer is made of an inorganic material or an organic material, the inorganic material being selected from a group consisting of silicon oxide, silicon nitride, silicon oxynitride, silicon carbide, hafnium oxide and aluminum oxide, the organic material being selected from a group consisting of photoresistor, enzocyclobutane (BCB), cycloolefins, polyesters, polyalcohols, polyethylene oxides, polyphenylenes, resins, polyethers and polyketones.

9. The manufacturing method of touchpad as claimed in claim 1, wherein the etching liquid used in the first time of lithography and etching processes is selected from a group consisting of phosphate, nitric acid, acetic acid and water, while the etching liquid used in the second time of lithography and etching processes is selected from a group consisting of nitric acid, hydrochloric acid and water.

10. The manufacturing method of touchpad as claimed in claim 1, wherein the lead layer is disposed on the insulation layer by means of silver paste printing or sputtering.

* * * * *